United States Patent [19]
Lee

[11] 3,878,050
[45] Apr. 15, 1975

[54] MULTI-DIFFERENTIAL AGAR CULTURE MEDIUM

[75] Inventor: Sun Yong Lee, Arvada, Colo.

[73] Assignee: Adolph Coors Company, Golden, Colo.

[22] Filed: Apr. 1, 1974

[21] Appl. No.: 456,984

[52] U.S. Cl. .................. 195/100; 195/99; 195/101; 195/102
[51] Int. Cl. ............................................. C12k 1/10
[58] Field of Search ............. 195/99, 100, 101, 102, 195/103

[56] References Cited
OTHER PUBLICATIONS

Max Louise and H. W. Schoenlein, Compilation of Culture Media, pg. 437, Williams and Wilkins Co., 1930.

*Primary Examiner*—Lionel M. Shapiro
*Assistant Examiner*—Robert J. Warden
*Attorney, Agent, or Firm*—Bertha L. MacGregor

[57] ABSTRACT

A multi-differential agar culture medium which has the capability to differentiate between a large variety of closely related bacterial species, comprising tomato juice, peptonized milk, yeats extract, glucose, calcium pantothenate, a pH lowering agent, a non-diffusible buffering agent, metals and minerals, a wetting agent and stimulator of growth of lactic acid bacteria, an acid-base color indicator, a yeast suppressing agent, and agar.

6 Claims, No Drawings

MULTI-DIFFERENTIAL AGAR CULTURE MEDIUM

This invention relates to culture media used in laboratories for identifying various bacteria, for example, the bacteria found in beer, and relates particularly to a multi-differential agar medium which has the capability to differentiate between a large variety of closely related bacterial species.

The most important basic difference between the medium of this invention and the media of the prior art is the fact that this medium is an agar medium that allows every brewery bacteria to grow on the plate and differentiates every individual genus of bacteria if they are presented. All brewery bacteria appear different in color or shape on the medium of this invention and can be differentiated and identified; said bacteria include the genus Lactobacillus, Pediococcus, Flavobacterium (Obesumbacterium), Enterobacter, Escherichia, Acetobacter, Acetomonas, and Zymomonas.

Most prior art differential media allow one to differentiate between grossly different microbial types, such as bacteria and yeast, or to differentiate between a relatively small number of types of bacteria. The multi-differential agar medium of this invention enables the user skilled in the art to differentiate between many types of organisms including those hereinabove mentioned.

Prior art culture media for the brewing industry include the following:

The Nakagawa medium which is a selective media for lactic acid bacteria only.

Universal Beer Agar (UBA) which was developed for enumerating purposes. It is not a selective or differential agar medium.

W. L. Differential Medium was developed primarily for separating brewery bacteria from yeast, using the yeast suppressor actidione. The medium was designed for pour plate whereas the medium of this invention employes smear plate method.

The Schwarz Differential Medium was developed for wild yeast detection, not for bacteria.

The Wort Agar Medium also was designed primarily for fungi and yeast enumeration.

The composition of the culture medium of this invention, identified as Lee's Multi-Differential Agar (LMDA), is as follows:

| | | |
|---|---|---|
| Tomato Juice | 20.0 | g |
| Peptonized milk | 20.0 | g |
| Yeast Extract | 10.0 | g |
| Glucose | 10.0 | g |
| Calcium pantothenate | 0.2–2.0 | g |
| Citric Acid (Monohydrate) | 1.10 | g |
| $CaCO_3$ | 5.0 | g |
| $K_2HPO_4$ | 0.5 | g |
| $KH_2PO_4$ | 0.5 | g |
| $MgSO_4$ | 0.2 | g |
| $MnSO_4$ | 0.01 | g |
| $FeSO_4$ | 0.01 | g |
| NaCl | 0.01 | g |
| Tween 80 | 0.5 | ml |
| Bromocresal Green | 0.022 | g |
| Actidione | 0.007 | g |
| Agar | 15.0 | g |
| Cold Distilled Water | 1.0 | l |

Substitutions may be made for certain of the above stated components. In this medium, a stated amount of citric acid was employed to give a final pH $5.5 \pm 0.1$. It is possible to replace this ingredient provided the pH can be adjusted with a pH lowering agent whereby the desired pH is maintained. The pH effect can be achieved with hydrochloric acid, malic acid, and other organic and inorganic acids. It is not believed that the growth stimulatory effect of citric acid can be achieved with other compounds.

Actidione (Cycloheximide) is added to the medium of this invention to suppress yeast growth and is not essential to the differentiating abilities of the medium. Actidione can be replaced by other yeast suppressing agents such as phenethyl alcohol or can be supplemented with polymixin B sulfate, penicillin, or other antibiotics to suppress the growth of gram negative bacteria.

Included in the components of the medium is calcium carbonate as a non-diffusible buffering agent. Calcium carbonate has not been used before in the brewing industry. Calcium carbonate, in the medium of this invention, is an important ingredient functioning to differentiate acid producing organisms from non-acid producers. Either lactic acid bacteria or acetic acid bacteria will produce a halo zone around colonies due to the acid production. Acid diffusion is limited by the non-diffusible buffer system ($CaCO_3$), hence produces a clear zone immediately surrounding the zones of colonies. The $CaCO_3$ was previously employed for differentiating acid producing organisms from other acid producing organisms; however, carboxymethyl cellulose (CMC) was used with calcium carbonate to keep the $CaCO_3$ in suspension. In the medium of this invention, the CMC was eliminated; and such use is believed to be its first use for differentiating brewery bacteria. Chalk powder could be used to replace the $CaCO_3$.

Bromocresal Green could be replaced by other acid-base color indicators such as propyl red, resazurin, congo red, and others showing a color change over the pH range of 3.0–6.0, but bromocresal green is preferred.

Peptonized milk is a complex nitrogen source which might be replaced by other components such as casein hydrolyzate.

Calcium pantothenate is an essential growth factor for many brewery bacteria. No substitute is available. Likewise, Tween 80, as a wetting agent and stimulator of the growth of lactic acid bacteria, has no acceptable substitute.

Agar serves as a solidifying agent. Gelatin, a possible substitute, is not satisfactory at the temperature used to grow brewery bacteria.

As to the tomato juice, no substitution is possible, but tomato juice broth (Difco, obtainable commercially) may be employed to replace the tomato juice, yeast extract, glucose and the metals and minerals listed as components hereinabove. Although the metals cannot be replaced, the proportions or amounts may be varied. The amounts shown have been found to be optimal.

I claim:

1. A multi-differential agar culture medium which has the capability to differentiate between a large variety of closely related bacterial species, comprising tomato juice, peptonized milk, yeast extract, glucose, calcium pantothenate, a pH lowering agent, a non-diffusible buffering agent, metals and minerals, a wetting agent and stimulator of growth of lactic acid bacteria, an acid-base color indicator, a yeast suppressing agent, and agar.

2. A multi-differential agar culture medium which has the capability to differentiate between a large variety of closely related bacterial species, comprising tomato juice broth, peptonized milk, calcium pantothenate, a pH lowering agent, calcium carbonate, a wetting agent and stimulator of growth of lactic acid bacteria, an acid base color indicator, a yeast suppressing agent, and agar.

3. A multi-differential agar culture medium which has the capability to differentiate between a large variety of closely related bacterial species, comprising the following components in substantially the amounts specified:

| | | |
|---|---|---|
| Tomato Juice | 20.0 | g |
| Peptonized milk | 20.0 | g |
| Yeast Extract | 10.0 | g |
| Glucose | 10.0 | g |
| Calcium pantothenate | 0.2–2.0 | g |
| Citric Acid (Monohydrate) | 1.10 | g |
| $CaCO_3$ | 5.0 | g |
| $K_2HPO_4$ | 0.5 | g |
| $KH_2PO_4$ | 0.5 | g |
| $MgSO_4$ | 0.2 | g |
| $MnSO_4$ | 0.01 | g |
| $FeSO_4$ | 0.01 | g |
| NaCl | 0.01 | g |
| Tween 80 | 0.5 | ml |
| Bromocresal Green | 0.022 | g |
| Actidione | 0.007 | g |
| Agar | 15.0 | g |
| Cold Distilled Water | 1.0 | l. |

4. A method of differentiating between a large variety of closely related bacterial species, comprising inoculating a sample to be tested into an aqueous solution of a culture medium composed of tomato juice, peptonized milk, yeast extract, glucose, calcium pantothenate, a pH lowering agent, a non-diffusible buffering agent, metals and minerals, a wetting agent and stimulator of growth of lactic acid bacteria, an acidbase color indicator, a yeast suppressing agent, and agar.

5. A method of differentiating between a large variety of closely related bacterial species, comprising inoculating a sample to be tested into an aqueous solution of a culture medium composed of tomato juice broth, peptonized milk, calcium pantothenate, a pH lowering agent, calcium carbonate, a wetting agent and stimulator of growth of lactic acid bacteria, an acid base color indicator, a yeast suppressing agent, and agar.

6. A method of differentiating between a large variety of closely related bacterial species, comprising inoculating a sample to be tested into an aqueous solution of a culture medium composed of the following components:

| | | |
|---|---|---|
| Tomato Juice | 20.0 | g |
| Peptonized milk | 20.0 | g |
| Yeast Extract | 10.0 | g |
| Glucose | 10.0 | g |
| Calcium pantothenate | 0.2–2.0 | g |
| Citric Acid (Monohydrate) | 1.10 | g |
| $CaCO_3$ | 5.0 | g |
| $K_2HPO_4$ | 0.5 | g |
| $KH_2PO_4$ | 0.5 | g |
| $MgSO_4$ | 0.2 | g |
| $MnSO_4$ | 0.01 | g |
| $FeSO_4$ | 0.01 | g |
| NaCl | 0.01 | g |
| Tween 80 | 0.5 | ml |
| Bromocresal Green | 0.022 | g |
| Actidione | 0.007 | g |
| Agar | 15.0 | g |
| Cold Distillated Water | 1.0 | l. |

* * * * *